Aug. 19, 1947.          J. F. KOVALSKY          2,426,027
                        REGULATING SYSTEM
                      Filed Dec. 11, 1943
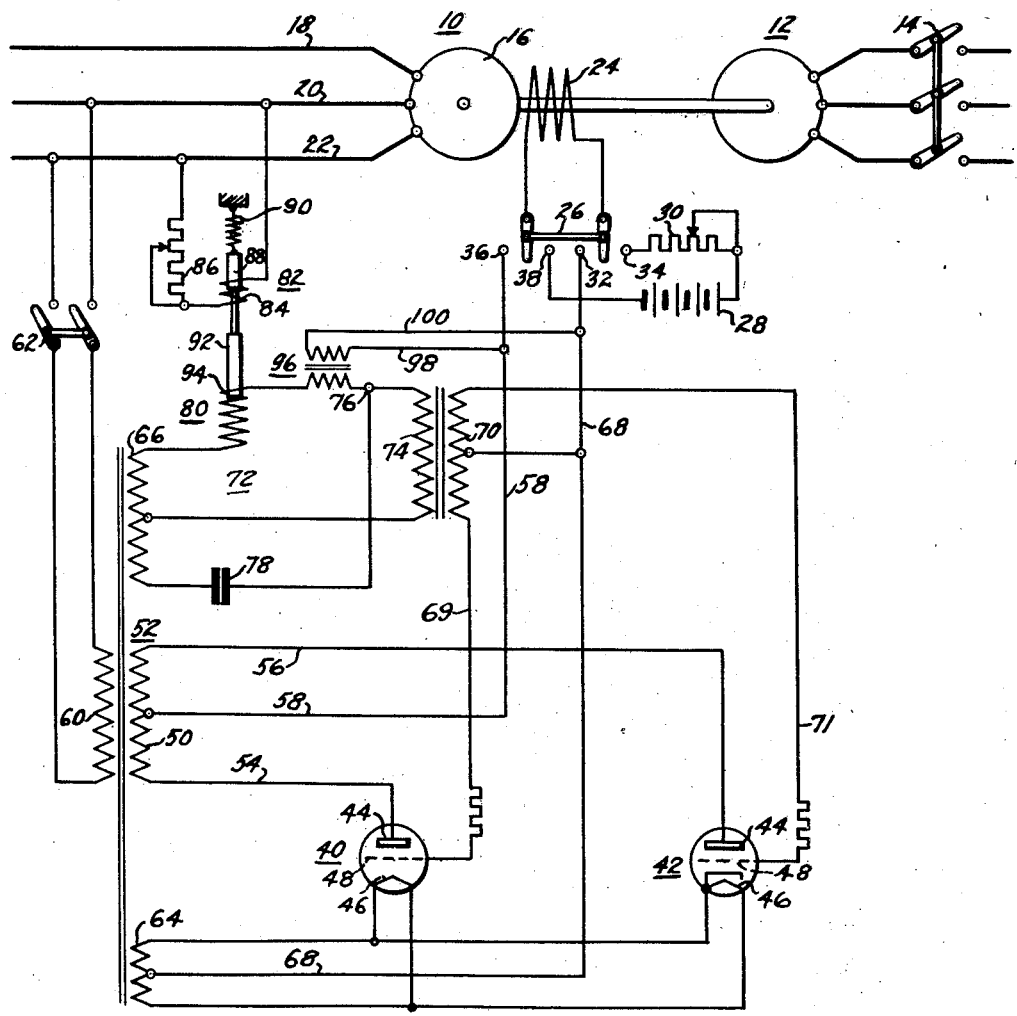
Fig.1.
WITNESSES:    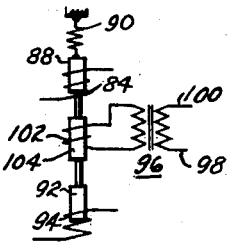    INVENTOR
              Fig.2.                  Joseph F. Kovalsky.
                                      BY
                                         ATTORNEY Patented Aug. 19, 1947

2,426,027

UNITED STATES PATENT OFFICE 2,426,027

REGULATING SYSTEM

Joseph F. Kovalsky, Turtle Creek, Pa., assignor to Westinghouse Electric Corporation, East Pittsburgh, Pa., a corporation of Pennsylvania Application December 11, 1943, Serial No. 513,888

4 Claims. (Cl. 171—119)

This invention relates to regulating systems and particularly to regulating systems for controlling the excitation of dynamo-electric machines.

An object of this invention is to provide for maintaining the voltage of a dynamo-electric machine substantially constant.

Another object of this invention is to provide a regulating system utilizing grid-controlled tubes for controlling the excitation of a dynamo-electric machine, the control of the bias of the grids of the tubes being responsive to the voltage of the dynamo-electric machine and being obtained by the use of a minimum of movable elements.

A further object of this invention is to utilize a variable reactor directly responsive to a change in voltage of a dynamo-electric machine to control the output of grid-controlled tubes which controls the excitation of the dynamo-electric machine.

Other objects of this invention will become apparent from the following description when taken in conjunction with the accompanying drawing, in which Figure 1 is a diagrammatic illustration of circuits and apparatus utilized in the regulating system of this invention, and Fig. 2 is a diagrammatic illustration of a modification of a part of the system illustrated in Fig. 1.

Referring to the drawing, this invention is illustrated by reference to an alternating-current generator 10 connected to be driven by a motor 12 which is disposed to be connected by means of the switch 14 to any suitable source of power (not shown). The generator 10 comprises an armature winding 16 connected to three phase circuit conductors 18, 20, and 22 and a field winding 24 connected to a two-pole switch 26 which may be moved to either of two circuit closing positions for connecting the field winding to a supply of unidirectional current energy.

As illustrated, in order to provide a source of energy for the starting of the generator 10 for bridging its voltage to substantially a normal or required value, a battery 28 having an adjustable rheostat 30 in series circuit relation therewith is provided, being disposed to be connected to the field winding 24 when the switch 26 is moved to the right-hand position to engage contact members 32 and 34. After the generator 10 is thus excited to bring its voltage to substantially the required value, the switch 26 may be moved to the left-hand position to engage contact members 36 and 38 to connect the field winding 24 to another and controlled source of unidirectional current. The latter source of unidirectional current comprises a system for receiving alternating-current energy from the generator 10 converting such energy while maintaining close control thereof and delivering unidirectional current to the field winding.

In the system illustrated, two grid-controlled tubes 40 and 42 having anodes 44, cathodes 46, and grids 48 are utilized for converting the alternating-current energy to unidirectional current. The anodes 44 of the tubes 40 and 42 are connected to opposite ends of a secondary winding 50 of transformer 52 by conductors 54 and 56 respectively, the midpoint of the winding 50 providing the negative terminal for the tube system and being connected by conductor 58 to the contact or terminal member 36.

The transformer 52 also has a primary winding 60 disposed to be connected by switch 62 across conductors 22 and 20 and secondary windings 64 and 66. The cathodes 46 of the tubes 40 and 42 are connected across the secondary winding 64 of the transformer 52, the midpoint of the winding 64 providing the positive terminal for the tube system and being connected by conductor 68 to the contact or terminal member 38. The conductor 68 is also connected to the midpoint of a transformer winding 70 the opposite ends of which are connected by conductors 69 and 71 to the grids 48 of tubes 40 and 42, respectively, to control the bias thereof.

The transformer winding 70 is connected to a phase shifting circuit indicated generally at 72 through an inductively related winding 74, one end of which is connected to the midpoint secondary winding 66 of transformer 52 and the other end of which is connected to a junction point 76 between which and one end of the winding 66 a condenser 78 is connected. A variable reactor 80 is connected between the opposite end of the winding 66 and the junction point 76. Since the secondary windings 50, 64, and 66 are all inductively related to the same primary winding, the alternating-current supplied to the phase shifting circuit 72 is of the same frequency as that supplied to the anode circuit of the tubes 40 and 42.

In order to control the reactance of the reactor 80, a voltage responsive device 82 is provided. The voltage responsive device 82 comprises the solenoid 84 connected through a variable resistor 86 to conductors 20 and 22 and a core member 88 normally biased by a spring 90 in the upward direction. The core member 88 is physically connected to the core member 92 of the reactor 80 and is disposed when the solenoid 84 is energized to move the core member 92 downwardly in the coil 94 of the reactor 80 to increase the reactance.

In order to stabilize the operation of the tubes 40 and 42 and prevent the system from hunting, an anti-hunting transformer 96 is connected to the phase shifting circuit 72 between the reactor 80 and the junction point 76, the transformer 96 being connected by conductors 98 and 100 across conductors 36 and 38 to be responsive to the output of the tubes 40 and 42.

In operation, with the switch 14 in a circuit closing position, the motor 12 drives the generator 10 and in starting, the switch 20 is in the righ-hand circuit closing position where the battery 28 supplies the exciting current for the field winding 24 of the generator. With the switch 62 in a circuit closing position, the output of the generator 10 is increased to substantially the required normal value, thus applying voltage to the primary winding 60 of the transformer 52 while at the same time energizing the winding 84 of the electroresponsive device 82 to actuate the core member 88 thereof downwardly against the bias of the spring member 90 to operate or position the core member 92 of the reactor.

After the control circuits are energized and the tubes 40 and 42 are heated and ready for operation, the switch 14 is manually moved to the left to engage contact members 36 and 38 and connect the field winding 24 to the tube circuit to receive energy therefrom. Current is supplied to the field winding 24 from the grid-controlled tubes 40 and 42 flowing from the cathodes 46 through the secondary winding 64 to the midpoint thereof and from thence through conductor 68, contact member 32, field winding 24, contact member 36, conductor 58, the opposite halves of the winding 50, and conductors 54 and 56 to the anodes 44 of the tubes 40 and 42 and through the space between the anodes 44 and the cathodes 46. The phase relation between the anode voltage and the voltage supplied to the grids 48 of the tubes 40 and 42 from the phase shifting circuit 72 determines the amount of each positive half-wave of the anode voltage during which current will pass through the tubes 40 and 42 and, consequently, determine the output of the tubes 40 and 42 and the excitation of the generator 10. The voltage of the phase shifting circuit 72 is controlled by the value of the reactance of reactor 80 as determined by the position of the core member 92 being adjusted by the electroresponsive device 82 in response to changes in the voltage of the generator 10.

As the generator 10 is started, its voltage is low and the core member 88 is in the upper position illustrated, being biased thereto by the spring 90. As the generator voltage increases, the solenoid 84 is energized to actuate the core member 88 downwardly to move the core member 92 relative to the coil of the reactor 80. The phase relations of the output of winding 70 to the grids 48 when the generator voltage is low is nearly in phase with the anode voltage supplied from the winding 50 so that the grids 48 permit current to pass through the tubes 40 and 42 early in each positive half cycle of the alternating-current wave from the winding 50. Thus, a substantially large current flows through the field winding 24 to increase the output voltage of the generator 10.

The increase in the output voltage of the generator 10 increases the energization of the winding 84 of the voltage responsive device 82 to effect a downward movement of the core member 88 against the force of the spring 90 to effect a positive adjustment of the core member of the variable reactor 80 to greatly increase the reactance thereof. As the reactance in the phase shifting circuit 72 has the effect of shifting the phase angle relation of the alternating-current voltage supplied to the grids 48 in a direction so that a greater time phase displacement between it and the anode voltage supplied to the tubes 40 and 42 is obtained, the current flow through the tubes 40 and 42 starts at a later period during each positive half-wave cycle of the anode voltage to effect a decrease in the current supplied to the field winding 24. The control of the output of the generator 10 is thus easily and smoothly effected. A change in the energization of the winding 84 effects the actuation of the core member of the variable reactor 82 against the pull of the spring 90 to vary the reactance in the one or the other direction to correspondingly vary the time phase relation between the grid voltage applied to the grids 48 with respect to the anode voltage applied to anodes 44 to increase or decrease the output from the tubes 40 and 42 supplied to the field winding 24 to thus maintain the desired voltage thereon.

Although the anti-hunt transformer 96 is illustrated in the preferred embodiment of this invention, it may not always be necessary to utilize such a transformer. Where the transformer 96 is used, it is found that an increase or decrease in the output of the tube circuit to the field winding 24 effects a corresponding increase or decrease in the voltage developed in the windings of the transformer 96 in a direction to modify the excitation supplied to the winding 74 in anticipation of the direction and rate of voltage change on the generator 10 to effect a stabilizing effect in the operation of the regulator system and prevent an over-correction in the operation of the regulating system in controlling the voltage output of the generator.

Where the system is utilized for regulating large dynamo-electric machines, the anti-hunt transformer 96 utilized may be so large that there is danger of the alternating current in the phase shifting circuit 72 inducing an alternating current in the secondary winding of the transformer, to detrimentally affect the operation of the regulating system. Where the system of this invention is thus employed it is preferred to utilize the stabilizing or anti-hunt circuit illustrated in Fig. 2 of the drawing.

In Fig. 2 the anti-hunt transformer 96 is connected to conductors 98 and 100 as in Fig. 1 to be responsive to the output of the tubes 40 and 42. The transformer 96 is not connected in the phase shifting circuit 72 but instead is connected across winding 102 which is disposed about a core member 104. As illustrated, the core member 104 is connected between and to the core members 88 and 92 and movable therewith, the movement of all three core members being controlled by the energization of the windings 84 and 102. The winding 102 is directly affected by an increase or decrease in the output of the tube circuit to control the anticipatory movement of the core 92 of the reactor in a direction to modify the shifting of the phase angle relation of the alternating current voltage supplied to the grids to control the output of the tube circuit.

The use of the variable reactor and the control of the position of the core member therein as described hereinbefore provides a very sensitive control and operation of the regulating system, the change in the output of the tube circuit being substantially instantaneous with the change in the voltage of the generator. By utilizing the reactor 80 having a positional core member, an extremely smooth, sensitive operation is obtained, the movable core member giving an extremely smooth adjustment of the reactance and the output of the tube circuit.

While this invention has been described with reference to a particular embodiment thereof, it is, of course, not to be limited thereto except insofar as is necessitated by the scope of the appended claims.

I claim as my invention:

1. In a regulating system, in combination, an alternating-current generator having a field winding, means for controlling the excitation of the field winding comprising a pair of tubes connected in circuit relation for receiving alternating-current energy from the generator and delivering unidirectional current to a field control circuit, means for controlling the output of the tubes comprising a phase shift circuit for shifting the phase angle relation of the alternating current voltage supplied to the tubes, the phase shift circuit including a reactor having a coil member and a core member disposed for movement relative to the coil member, means responsive to a change in the voltage of the generator disposed to actuate the core member of the reactor to control the output of the tubes and thereby control the excitation of the generator, and means responsive to the output of the tubes associated with the phase shift circuit disposed for so controlling the positioning of the core member of the reactor as to modify the shifting of the phase angle relation of the alternating current voltage supplied to the tubes for providing anti-hunt characteristics in the control of the tubes.

2. In a regulating system, in combination, an alternating-current generator having a field winding, means for controlling the excitation of the field winding comprising a pair of grid-controlled tubes connected in circuit relation for receiving alternating-current energy from the generator and delivering unidirectional current to a field control circuit, means including a phase shift circuit for controlling the bias of the grid-controlled tubes to control the output thereof, the phase shift circuit including a reactor having a core member disposed for movement therein, a solenoid disposed to be energized in response to the voltage of the generator, the solenoid having a core member connected to the core member of the reactor disposed for movement in accordance with the energization of the solenoid to control the reactance of the reactor and thereby control the output of the tubes and the excitation of the generator, and means comprising a winding responsive to the output of the tubes associated with the reactor and disposed to modify the movement of the core member thereof for providing anti-hunt characteristics in the control of the tubes.

3. In a regulating system, in combination, an alternating-current generator having a field winding, means for controlling the excitation of the field winding comprising a pair of tubes connected in circuit relation for receiving alternating-current energy from the generator and delivering unidirectional current to a field control circuit, means for controlling the output of the tubes comprising a phase shift circuit, the phase shift circuit including a reactor having a coil member and a core member disposed for movement relative to the coil member, means responsive to a change in the voltage of the generator disposed to actuate the core member of the reactor to control he output of the tubes and thereby control the excitation of the generator, and means responsive to the output of the tubes disposed to modify the actuation of the core member for providing anti-hunt characteristics in the control of the output of the tubes.

4. In a regulating system, in combination, an alternating-current generator having a field winding, means for controlling the excitation of the field winding comprising a pair of grid-controlled tubes connected in circuit relation for receiving alternating-current energy from the generator and delivering unidirectional current to a field control circuit, means including a phase shift circuit for controlling the bias of the grid-controlled tubes to control the output thereof, the phase shift circuit including a reactor having a core member disposed for movement therein, a solenoid disposed to be energized in response to the voltage of the generator, the solenoid having a core member connected to the core member of the reactor disposed for movement in accordance with the enerigzation of the solenoid to control the reactance of the reactor and thereby control the ouput of the tubes and the excitation of the generator, and means responsive to the output of the tubes disposed to modify the movement of the core member of the reactor for providing anti-hunt characteristics in the control of the output of the tubes.

JOSEPH F. KOVALSKY.

REFERENCES CITED

The following references are of record in the file of this patent:

UNITED STATES PATENTS

| Number | Name | Date |
|---|---|---|
| 2,366,577 | Thompson | Jan. 2, 1945 |
| 2,057,520 | Gulliksen | Oct. 13, 1936 |
| 2,005,892 | Gulliksen | June 25, 1935 |
| 1,654,987 | Mittag | Jan. 3, 1928 |
| 2,229,968 | Garman | Jan. 28, 1941 |
| 2,019,328 | Thompson | Oct. 29, 1935 |